C. F. BURGESS.
PROCESS FOR REDUCING ZINC OXIDS.
APPLICATION FILED OCT. 8, 1909.
1,059,342.
Patented Apr. 22, 1913.
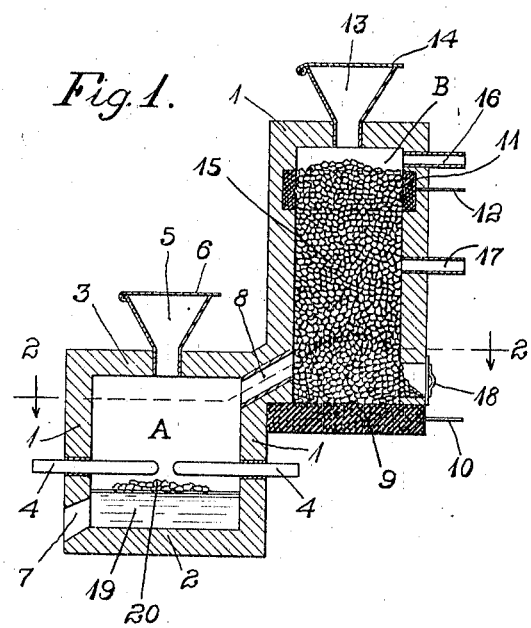
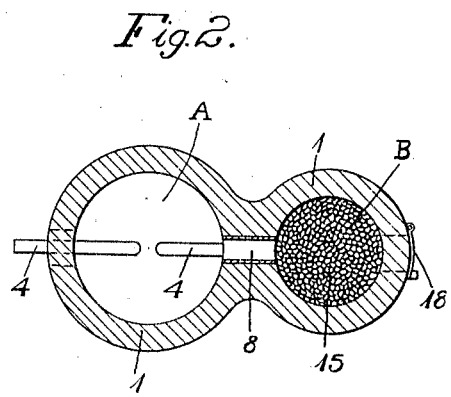
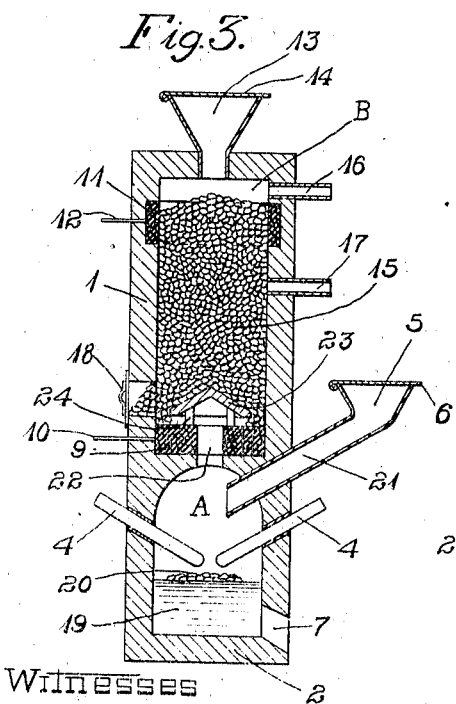
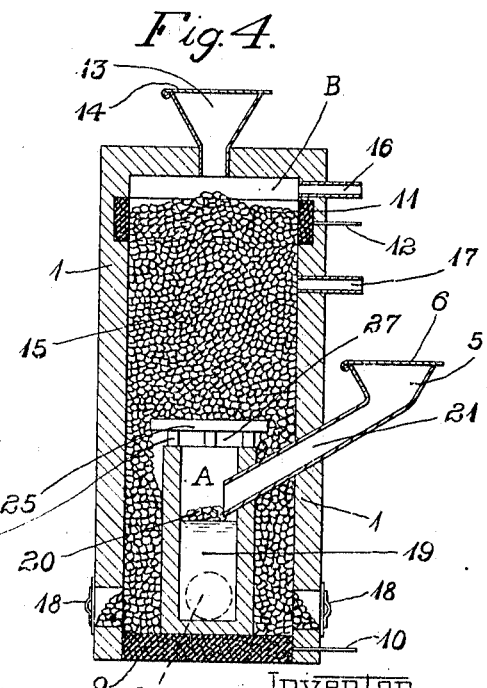
Witnesses
George E. Higham.
Leonard W. Novander.
Inventor
Charles F. Burgess
By Brown Williams
Attorneys

UNITED STATES PATENT OFFICE.

CHARLES F. BURGESS, OF MADISON, WISCONSIN.

PROCESS FOR REDUCING ZINC OXIDS.

1,059,342.  Specification of Letters Patent.  Patented Apr. 22, 1913.

Application filed October 8, 1909. Serial No. 521,761.

*To all whom it may concern:*

Be it known that I, CHARLES F. BURGESS, a citizen of the United States, residing at Madison, in the county of Dane and State of Wisconsin, have invented a certain new and useful Improvement in a Process for Reducing Zinc Oxids, of which the following is a full, clear, concise, and exact description, reference being had to the accompanying drawings, forming a part of this specification.

My invention relates to a process for reducing zinc oxids.

According to the usual practice the zinc ore or oxid of zinc, is intimately mixed with carbon and the mixture is then subjected to heat in a clay retort, the vapors being condensed in a suitable clay condenser. In this process it is possible to conduct the reducing operations with only comparatively small quantities of ore in a single retort. It is, therefore, necessary to use a large number of retorts in order to obtain any considerable production of metallic zinc. Moreover in this method of reduction there is considerable loss of heat owing to the necessity of heating through the walls of the clay retorts. It is customary in mixing the charge to use a considerable excess of carbon for the reducing action and even then the reduction of the ore is by no means complete. In order to avoid corrosion of the walls of the retort, it is necessary to employ a high grade ore with a low content of iron and other impurities.

Numerous methods have been tried for smelting zinc ores electrically, but in all of these, so far as I am aware, an intimate mixture of the zinc ore and the carbon, which acts as a reducing agent, is employed.

The method which forms the subject of this invention consists in maintaining the zinc ore and the carbon entirely separate from each other. In the preferred form of my process, the zinc ore is heated electrically and zinc oxid is thereby volatilized. Simultaneously a mass of carbon is subjected to a current of electricity to heat it to a proper reducing temperature and the vapors of zinc oxid from the ore are then brought into contact with the mass of carbon. In this way it is apparent that there is an intimate association of the vapor of the zinc oxid with the glowing carbon and the reducing action is thoroughly and quickly accomplished. After passing through the mass of reducing carbon the vapors of zinc are condensed by any of the well known methods.

I have found by experimental work that zinc oxid begins to vaporize from the ore at a temperature of about 1100 degrees centigrade, and this is, therefore, the minimum temperature in which that portion of the furnace containing the ore, should be maintained. I found that by heating at a higher temperature the action is carried on more rapidly but the temperature should not be raised to such a point that other oxids or impurities will be volatilized with the zinc. My experiments have shown that zinc oxid may be completely removed from ordinary roasted zinc ore by the method which I have just described.

The mass of carbon is maintained at a temperature which is adapted to carry on the reducing action on the vapors of the oxids of zinc which are brought into contact with the carbon. The advantage of this feature of my invention is very considerable, inasmuch as the proper temperatures for volatilizing zinc oxid and for conducting the reducing operation are not the same, the proper temperature of the carbon being considerably lower than that which is required to volatilize the zinc oxid.

After the zinc oxid has been completely volatilized from the ore, the residue may be removed from the volatilizing chamber preferably in the form of a molten slag. The liquefaction of this residue may be insured, where necessary, by the addition of suitable fluxing agents, as, for example, lime.

By intermittently charging the zinc ore into the volatilizing chamber and removing the residue in the form of molten slag, it is evident that the volatilizing action may be made continuous. Similarly, as the carbon is burned by the oxygen given out from the volatilized oxid of zinc, the ashes formed thereby may be removed from time to time and additional carbon added in the reducing chamber. The operation of the furnace, as a whole, is thereby rendered continuous with the consequent advantages of increased output and reduced cost of operation besides the other advantages which I have described above. These and other advantages will be more apparent by reference to the drawings, in which—

Figure 1 is a diagrammatic vertical section of one form of a smelting furnace. Fig. 2 is a transverse section on the line 2—2 of Fig. 1, Fig. 3 is a diagrammatic section of a modified form of furnace, and Fig. 4 is a diagrammatic vertical section of a second modified form of furnace.

Referring to Figs. 1 and 2, the furnace is provided with a vaporizing chamber A having walls 1—1, a bottom or hearth 2, and a roof 3, which are built of fire brick or other suitable refractory material. The exact nature of the refractory brick which are employed depends largely on the nature of the ore which is to be smelted. If, in order to obtain a more liquid slag, it is desired to add lime to the ore, all portions of the chamber which come in contact with the ore should be built of magnesite or other basic brick. If, on the other hand, it is desired to make no additions of lime or other basic material, the slag may be of an acid character, as is well understood by those skilled in the art, and silica brick should be employed.

Projecting through the walls 1—1 of the chamber A are electrodes 4—4 suitably connected to a source of electric power. These electrodes are adapted to form an arc between their ends, this arc serving as the means of heating and volatilizing the volatile oxid from the ore.

A hopper 5 is provided in the roof of the chamber A, this hopper having a cover 6. In the lower part of the chamber A is a tap hole 7 which is ordinarily filled with sand or magnesite according to the nature of the brick of which the interior of the chamber is constructed. This tap-hole is for the purpose of periodically drawing off slag which may be formed from the ore.

Associated with the chamber A of the furnace is a second chamber B, connected with the chamber A by the flue 8 through which gases may pass from chamber A to chamber B. Chamber B is built of some form of refractory fire brick. Ordinarily silica brick may be satisfactorily used, inasmuch as there is no basic slag which may come in contact with the walls of the chamber, as is the case with chamber A. The bottom of the chamber B is provided with a conducting plate 9 of graphite or other similar material which acts as an electrode, this plate 9 being connected with a source of electricity through the conductor 10. Toward the upper part of chamber B is provided a ring 11 of similar material which acts as a second electrode and is connected with the second pole of the source of power through the conductor 12. A hopper 13, having a cover 14 is placed at the top of the furnace and it is through this hopper that the carbon 15, with which the chamber B is filled, may be added. Two outgoing flues 16 and 17 are provided toward the upper part of the chamber B. Toward the bottom of chamber B is provided a door 18 through which the ashes of the burned carbon 15 may be readily removed.

The operation of my furnace will now be readily understood.

Ore is first added to the chamber A through the hopper 5. Heat being generated by means of the arc formed between the electrodes 4—4, the ore is gradually heated and the zinc oxid is volatilized, the residue of the ore forming a molten slag 19, a fresh addition of ore being represented at 20. Simultaneously the current is caused to flow between the electrodes 9 and 11 of chamber B and the carbon 15 is gradually heated to the proper temperature, this carbon acting as resistance in the electric circuit. It is clear that there is but little access of air to chamber B and for this reason, the carbon will not be burned when heated merely by the electric current flowing between the electrodes 9 and 11. After the vapors of zinc oxid pass from the chamber A through the flue 8 to the chamber B, it is clear that there will be an intimate contact between these vapors and the reducing carbon. The oxygen from the vapor will now be given up to the carbon and the reaction:

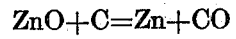

$$ZnO + C = Zn + CO$$

will take place. The vapor continues to rise in the chamber B, the reducing action continuing until all of the zinc oxid has been reduced to the vapor of metallic zinc. The reduced vapors then pass outwardly through the flues 16 and 17 and are then condensed by any of the well known methods. The consumption of carbon, which is preferably in the form of coke, is very limited, inasmuch as the only oxidizing action on this carbon is that of the oxygen from the vapors of zinc oxid.

A modification of my furnace is shown in Fig. 3, in which the chamber A is placed directly below the chamber B. The ore is added through the hopper 5 which is provided with an extension 21 which passes through the side of the furnace into the chamber A. The disposition of the electrodes 4—4, and the tap-hole 7 is similar to that illustrated in Fig. 1. In the upper part of the chamber A is provided a flue or outlet 22, over which is placed a bell 23 preferably built of fire brick. This bell is supported by a vertical wall 24 which, in turn, rests on the electrode 9. In the wall 24 are placed frequent openings in order to provide means of egress of the vapors from the chamber A to the chamber B. The object of the bell 23 is to prevent the carbon 15 from dropping into the chamber A. With the differences which have just been pointed out, the operation of the modification shown in Fig. 3 is otherwise identical with the form illustrated in Figs. 1 and 2.

In Fig. 4 a second modification is shown. The outside of the chamber B corresponds with the outside of the furnace, and the chamber A occupies a position inside of the chamber B and in the lower part of the same. The electrode 9 is placed at the bottom of chamber B and just below chamber A. As the current flows between the electrodes 9 and 11, the mass of carbon 15 is thereby heated and on account of the smaller cross-sectional area of that portion of the carbon which lies in the same horizontal plane with the chamber A, this portion will thereby become heated to a higher temperature than that attained by the carbon above the chamber A. The heat from the portion of carbon lying opposite the chamber A is conducted through the walls of this chamber and the ore is thereby heated by reduction and the zinc oxid is readily volatilized. Chamber A is provided with a roof 25 retained in position by supports 26 between which there are spaces 27. The object of the roof 25 is to prevent the carbon 15 from falling into the chamber A. The tap-hole 28 enters the lower part of chamber A and it is through this tap-hole that the molten slag can be removed. With the exception of the modifications which we have described, the operation of the furnace illustrated in Fig. 4 is the same as that of the furnaces shown in Figs. 1, 2 and 3.

Although I have described my process of reducing ores as applied particularly to ores of zinc, I do not wish to confine myself to the ores of this metal, inasmuch as my process also has application in the smelting of other ores, as, for example, antimony, bismuth, lead, etc.

Many modifications can be made from the exact process which I have described without departing from the spirit of my invention. For instance, it is obvious that the necessary heating might be done otherwise than electrically—although, as I have said, in the preferred manner of carrying out my process electricity is used as the source of heat.

What I claim as new and desire to cover by United States Letters Patent is:

1. The process of reducing zinc oxid which consists in electrically heating said oxid to a temperature sufficient to produce volatilization, simultaneously heating a mass of carbon, and conducting the vapors of the zinc oxid into contact with the mass of carbon.

2. The process of reducing zinc oxid which consists in electrically heating said oxid to a temperature sufficient to produce volatilization in one chamber, simultaneously heating a mass of carbon in a second chamber, and conducting the vapors of the zinc oxid from said first chamber to said second chamber.

3. The process of reducing zinc oxid which consists in electrically heating a mass of carbon, simultaneously heating the zinc oxid to a temperature sufficient to produce volatilization, and conducting the vapors of the volatilized zinc oxid into contact with the carbon.

4. The process of reducing zinc oxid which consists in heating said oxids to a temperature sufficient to produce volatilization, simultaneously heating a mass of carbon to a temperature suitable to produce reduction, and conducting the vapors of the volatilized zinc oxid into contact with the heated carbon.

5. The process of reducing oxids of zinc which consists in electrically heating a mass of carbon to a suitable reducing temperature in one chamber, simultaneously heating the oxid of zinc to a suitable volatilizing temperature in a second chamber, and conducting the vapors of said volatilized zinc oxid from said second chamber into said first chamber.

6. The process of reducing zinc ore which consists in heating the ore to a temperature sufficient to volatilize zinc oxid, simultaneously heating a mass or carbon to a reducing temperature, and conducting the vapors of said zinc oxid into contact with said carbon.

7. The process of reducing metallic oxids which consists in heating said oxids by an electric arc to a temperature sufficient to produce volatilization, simultaneously heating a mass of carbon included as resistance in an electric circuit, and bringing the vapors of the metallic oxids into contact with the mass of carbon.

8. The process of reducing metallic ores which consists in heating a mass of carbon by including said carbon as resistance in an electric circuit, simultaneously heating the metallic ore to a temperature sufficient to volatilize the oxid of the metal of said ore, and conducting the vapors of the volatilized oxid into contact with the mass of carbon.

9. The process of reducing oxid of zinc which consists in heating a mass of carbon by including said carbon as resistance in an electric circuit, simultaneously heating the zinc oxid to a temperature to produce volatilization, and conducting the vapors of the volatilized oxid into contact with the mass of carbon.

10. The process of reducing zinc oxid which consists in heating said oxid to, a temperature sufficient to volatilize the same, conducting the vapors of the zinc oxid into contact with suitable reducing material, and condensing the vapors of zinc.

11. The process of reducing metallic oxids which consists in heating, said oxids to a temperature sufficient to volatilize the same, conducting the vapors of the metallic oxid into contact with suitable reducing material, and condensing the vapors of the reduced metal.

12. The process of reducing zinc ore which consists in heating the ore until zinc oxid is evolved, and conducting the zinc oxid into contact with heated carbon, while maintaining the ore, separate from the carbon.

13. The process of reducing metallic ores which consists in heating the ore until the oxid of the metal of said ore is evolved, and conducting the metallic oxid into contact with heated carbon, while maintaining the ore separate from the carbon.

14. The process of reducing metallic ores which consists in heating the ore until the metal compound of said ore is volatilized, and conducting the vapors of said compound into contact with a suitable reducing material, while maintaining the ore separate from the reducing material.

15. In the process of reducing zinc ore, the step which consists in conducting the vapors of zinc oxid formed into contact with heated carbon, while maintaining the ore separate from the carbon.

16. In the process of reducing metallic ore, the step which consists in conducting the vapors of the metallic oxid formed into contact with heated carbon, while maintaining the ore separate from the carbon.

17. The process of reducing zinc oxid which consists in heating said oxid to a temperature sufficient to produce volatilization, simultaneously heating a mass of carbon to a temperature suitable to produce reduction, and conducting the vapors of the volatilized zinc oxid upwardly through the interstices between the particles of said mass.

18. The process of reducing zinc oxid which consists in heating said oxid to a temperature sufficient to produce volatilization, simultaneously heating a column of carbon to a temperature suitable to produce reduction, introducing the zinc oxid vapors into the interstices between the particles of said column at the bottom thereof, and drawing off the reduced vapors from the top of said column and from a zone intermediate of the top and bottom thereof.

19. The process of reducing zinc oxid which consists in electrically heating said oxid to a temperature sufficient to produce volatilization in one chamber, simultaneously heating a mass of carbon in a second chamber, conducting the zinc oxid vapors to the bottom of said second chamber, and drawing off the reduced vapors from the top of said second chamber and from a zone intermediate of the top and bottom thereof.

In witness whereof, I hereunto subscribe my name this 2nd day of October, A. D. 1909.

CHARLES F. BURGESS.

Witnesses:
  HENRY CASSON, Jr.,
  ANNA B. LUCK.